UNITED STATES PATENT OFFICE.

HERBERT J. KEITH AND SIMEON C. KEITH, JR., OF SOMERVILLE, MASSACHUSETTS, ASSIGNORS TO H. J. KEITH COMPANY, OF BOSTON, MASSACHUSETTS, A CORPORATION OF MASSACHUSETTS.

PRESERVING EGGS.

955,835.     Specification of Letters Patent.     Patented Apr. 19, 1910.

No Drawing.     Application filed May 18, 1909. Serial No. 496,758.

*To all whom it may concern:*

Be it known that we, HERBERT J. KEITH and SIMEON C. KEITH, Jr., of Somerville, in the county of Middlesex and State of Massachusetts, have invented certain new and useful Improvements in Preserving Eggs, of which the following is a specification.

In the preservation of the eggs of poultry, it has, according to one method, been customary to remove the eggs from the shell, and, after making a batter thereof so as to blend the yolk and white together and then straining the batter, to place the batter in jars or cans and to subject the same to a freezing process. In the freezing of the eggs, it has been customary to expose it to a temperature of 0° F. or below. The batter at this temperature freezes so that the egg may be kept for a practically unlimited time. Eggs thus treated and frozen are much used by bakers in lieu of fresh shell eggs, and are preferable to shell eggs which have been kept long in storage.

It is a curious fact that, where egg batter, as described above, is subjected to a temperature of approximately 25° F. it freezes, but at such a temperature the egg slowly deteriorates in flavor and suffers bacteriological decomposition,—whereas when frozen to a solid mass at a temperature of 0° F. the bacteriological decomposition apparently does not set in, and yet at the same time the egg seems to change physically and to become much thicker.

When egg batter which has been frozen solid at substantially 0° F. temperature is allowed to thaw, the thawed batter does not possess the physical characteristics of the original batter, but consists of a thick, gelatinous mass and a separated watery substance, the permanent thickening and physical modification of the batter being in proportion to the amount of yolk which the batter contains. After having been frozen and then thawed, the pure yolk of the egg is so thick that it is not readily blended with milk or other ingredients used in baking, and is in the form of a paste rather than liquid egg. On the contrary, the white of the egg appears to suffer no such change by freezing, and when thawed out it resembles the fresh white of the egg and may be used in substantially the same way as the fresh white. The whole egg, however, containing the yolk and the white, undergoes a permanent thickening and change when frozen at a temperature of substantially 0° F., similar to that of the yolk but in a less degree.

Speaking generally, eggs consist of the white, containing substantially 5 parts of albumen and 31 parts of water, and the yolk, containing substantially 6 parts of fat, 3 parts of protein and 9 parts of water. The physical characteristics of the fats and the albumen are apparently unchanged by freezing and subjection to low temperature, the only constituent of the egg which appears to be changed being the yolk protein. It is our theory that the protein exists in the fresh egg in what may be termed a colloidal state, and it is possible that the thickening of the yolk by subjection to a low temperature is due to coagulation or agglutination of the particles comprising the protein, so that it exists no longer in the colloidal state but on the contrary in a precipitated state. This however is only a theory.

The object of the present invention is to prevent the permanent thickening of the egg mixture containing the yolk of the egg when subjected to low temperatures, so that the physical characteristics of the fresh egg will be preserved and a deterioration of the egg both as to flavor and otherwise be prevented.

We have found that if a small quantity of sugar, or other saccharin substance or equivalent of sugar, is added to the fresh yolk or to the batter of mixed yolk and white, the permanent thickening and physical change of the yolk by freezing of the yolk or batter are prevented, and the natural characteristics of the egg substance may thus be preserved for an indefinite period. In practice, we add to the egg batter or yolk about 5 to 25%, usually about 10%, by weight, of fine granulated cane sugar. The mixture is then frozen solid, and held below the point where decomposition may occur, as by subjecting it to a temperature of zero Fahrenheit, and is maintained frozen until desired for use. When thawed, the egg substance resembles that of the natural egg in its useful physical characteristics and is of much greater commercial value than ordinary frozen egg.

We are unable to employ a generic term for the class of materials which may be used in the preservation of the egg, and hence in the claims where we use the word "sugar" as the material to be added to the egg batter or mixture, we desire to be understood as meaning thereby any saccharin or similar substance or compound which is the equivalent of sugar. The term "egg", as used in the claims, is intended to include either the whole egg substance, or the separated yolks.

Having thus explained the nature of our said invention and described a way of making and using the same, although without attempting to set forth all of the forms in which it may be applied, what we claim is:

1. The method of preserving egg, which consists in adding sugar thereto, freezing the mixture below the temperature of decomposition, and maintaining it frozen until desired for use, the amount of added sugar being sufficient to substantially prevent permanent thickening and physical modification of the egg substance when thawed.

2. As a new article of manufacture, egg containing added sugar and frozen below the temperature of decomposition, the amount of added sugar being sufficient to substantially prevent permanent thickening and physical modification of the egg substance when thawed.

In testimony whereof we have affixed our signatures, in presence of two witnesses.

HERBERT J. KEITH.
SIMEON C. KEITH, Jr.

Witnesses:
　MARCUS B. MAY,
　P. W. PEZZETTI.